UNITED STATES PATENT OFFICE.

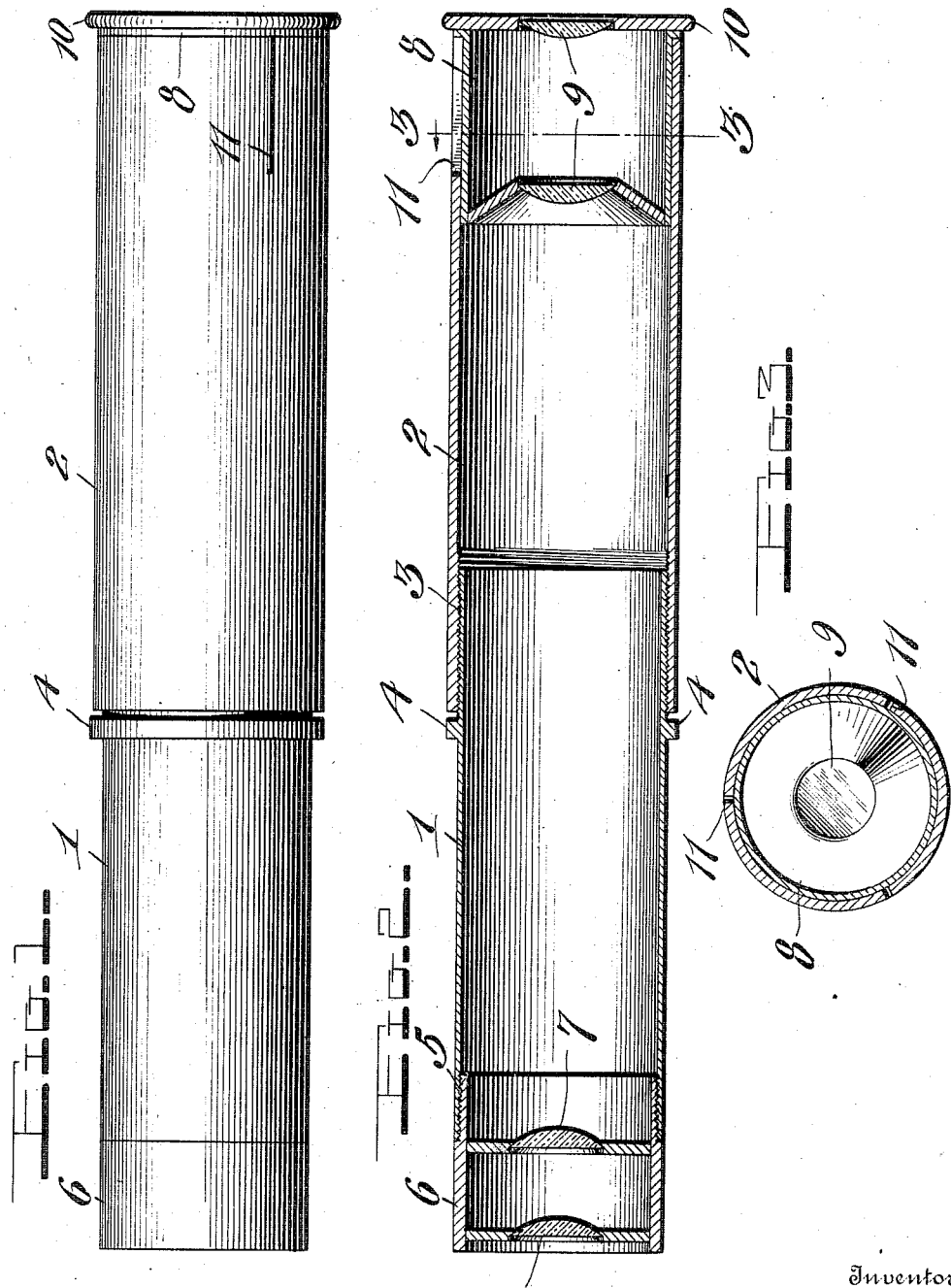

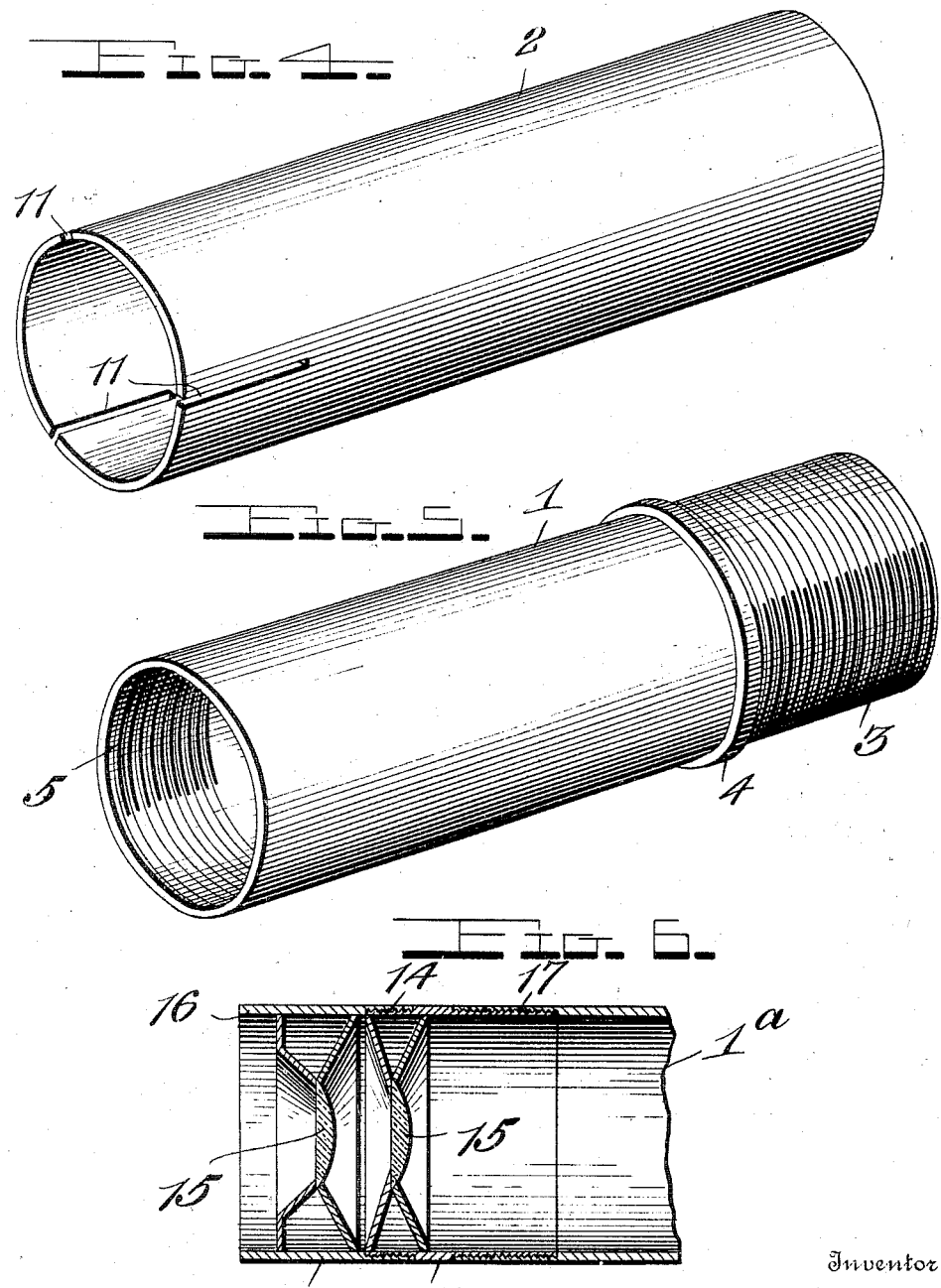

THOMAS JOHN JANDA, OF PITTSBURG, PENNSYLVANIA.

ATTACHMENT FOR OPTICAL INSTRUMENTS.

973,438.  Specification of Letters Patent.  Patented Oct. 18, 1910.

Application filed June 25, 1910. Serial No. 568,910.

*To all whom it may concern:*

Be it known that I, THOMAS JOHN JANDA, a citizen of the United States, residing at Pittsburg, in the county of Allegheny and State of Pennsylvania, have invented certain new and useful Improvements in Attachments for Optical Instruments, of which the following is a specification, reference being had to the accompanying drawings.

This invention relates to attachments for telescopes and other astronomical and optical instruments, and more particularly to a micro-fine adjusting eye piece tube.

One object of the invention is to provide a simple and practical attachment of this character capable of being used in telescopes and other instruments and adapted to support, for very fine adjustment with respect to each other, an eye piece objective and an ordinary astronomical or optical instrument eye piece, whereby a compound microscope is provided in the telescope for changing the magnifying power, the construction being such that different power objectives and different power eye pieces may be employed in the device so as to permit of a wide range of use.

Another object of the invention is to provide a device or attachment of this character which will not only permit the magnifying power of the telescope to be increased or changed but which may effectively take the place of terrestrial erecting prisms, being much better than the same, and at the same time cheaper to construct.

With the above and other objects in view, the invention consists of the novel features of construction and the combination and arrangement of parts hereinafter fully described and claimed and illustrated in the accompanying drawings in which—

Figure 1 is a side view of the device or attachment. Fig. 2 is a longitudinal section. Fig. 3 is a transverse section taken on line 3—3 in Fig. 2. Fig. 4 is a perspective view of the socket member or tube of the device. Fig. 5 is a detail view of the attaching member or tube, and Fig. 6 is a detail sectional view showing another form of objective that may be used in the attaching tube.

The preferred embodiment of the invention illustrated in the drawing consists of two tubes 1, 2, telescopically engaged and having very fine screw threaded engagement with each other as indicated at 3, whereby they may be adjusted for focusing. The front or outer tube 1, is adapted to be inserted in a telescope or other astronomical or optical instrument in which the eye piece is to be used, and to limit the inward movement of the tube or member 1, into the telescope, it is provided adjacent the threads 3 with a stop collar 4. The front extremity of the tube 1, is internally screw threaded at 5, to be engaged by an externally threaded objective holder or cap 6, the latter containing one or more objective lenses 7. Different kinds of objectives may be applied to the tube 1 for the purpose of varying the magnifying power of the device.

The rear tube or member 2 is adapted to serve as a socket tube for an ordinary instrument eye piece 8, which may contain one or more eye piece lenses 9. This eye piece 8 consists of a cylinder removably arranged in the rear end of the tube 2, and provided at its rear extremity with an annular rim or collar 10, to limit its inward movement into said tube. To more effectively retain the eye piece 8 in position, the rear end of the tube 2 is preferably formed with three longitudinal slits 11 to increase the frictional engagement between the parts. Different eye pieces containing different power lenses may be placed in the socket tube 2, according to the degree of magnifying power desired.

In using the invention, the proper objective and eye piece lenses are arranged at the opposite ends of the attaching and socket tubes 1, 2, respectively, and the attaching tube 1 is then inserted in the telescope or other instrument in which the improved magnifying eye piece is to be used. The socket tube 2, is then rotated to secure the proper focus.

Among the many advantages of my invention, may be noted the following: It increases and changes the magnifying powers of telescopes and also takes the place of terrestrial erecting prisms, being better than the latter, and cheaper to construct. The device provides in effect a compound microscope capable of use in various instruments and capable of a very wide range of use, because different power objectives and different power eye pieces may be employed for varying the magnifying power. Over the present day astronomical and other eye pieces, it has the advantage that to secure the same magnifying power, it is not necessary to bring the eye as close to the eye piece. Over terrestrial erecting prisms it has the advantage of consisting of straight tubes and also of being much cheaper to construct.

In Fig. 6 of the drawings, I have shown another form of objective which may be used in the attaching member 1. This objective consists of outer and inner tubular sections 12, 13, which have a screw threaded connection with each other connected at 14, whereby they may be separated to permit of the cleaning of the two lenses 15 which they carry, and also to permit sections containing lenses of different power to be interchanged. The outer section 12 has a longitudinally projecting protecting rim 16, while the inner section 14 is externally screw threaded at 17, to screw into the internally threaded end of the attaching tube 1ª.

I claim:

1. An attachment of the character set forth comprising attaching and socket tubes having a fine screw-threaded engagement for focusing purposes, a stop on the attaching tube for limiting its movement into an instrument, an objective lens holding means removably arranged on the front end of the attaching tube, and an eye piece removably arranged in the rear end of the socket tube, and carrying a lens.

2. An attachment of the character set forth comprising adjustably engaged tubes, one being adapted for insertion in an instrument, an eye piece removably mounted in one of said tubes, and a two part objective removably mounted in the other tube, the two parts of said objective being detachably engaged and carrying lenses.

In testimony whereof I hereunto affix my signature in the presence of two witnesses.

THOMAS JOHN JANDA.

Witnesses:
MAX H. SROLOVITZ,
R. PAULIN.